(12) United States Patent
Liu et al.

(10) Patent No.: US 10,976,587 B2
(45) Date of Patent: Apr. 13, 2021

(54) DISPLAY APPARATUS AND DISPLAY METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yali Liu, Beijing (CN); Chenru Wang, Beijing (CN); Hao Zhang, Beijing (CN); Lili Chen, Beijing (CN); Ruijun Dong, Beijing (CN); Xuebing Zhang, Beijing (CN); Ke Li, Beijing (CN); Wenyu Li, Beijing (CN); Yinwei Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 138 days.

(21) Appl. No.: 16/374,587

(22) Filed: Apr. 3, 2019

(65) Prior Publication Data
US 2019/0324318 A1 Oct. 24, 2019

(30) Foreign Application Priority Data
Apr. 23, 2018 (CN) .......................... 201810368736.2

(51) Int. Cl.
*G02F 1/1335* (2006.01)
*H04N 13/344* (2018.01)
*G09G 3/20* (2006.01)

(52) U.S. Cl.
CPC .. *G02F 1/133509* (2013.01); *G02F 1/133526* (2013.01); *G09G 3/2003* (2013.01); *H04N 13/344* (2018.05)

(58) Field of Classification Search
None
See application file for complete search history.

(56) References Cited

U.S. PATENT DOCUMENTS

2008/0284982 A1 11/2008 Richards et al.
2010/0066813 A1 3/2010 Jorke
(Continued)

FOREIGN PATENT DOCUMENTS

CN 101263412 A 9/2008
CN 102959455 A 3/2013
(Continued)

OTHER PUBLICATIONS

First Office Action issued in corresponding Chinese Application No. 201810368736.2, dated Feb. 6, 2020, with English language translation.

*Primary Examiner* — Amare Mengistu
*Assistant Examiner* — Sarvesh J Nadkarni
(74) *Attorney, Agent, or Firm* — McDermott Will and Emery LLP (57) ABSTRACT

A display apparatus includes a display panel configured to output light for displaying a mixed image including a first image and a second image, and a filter device disposed at a light exit side of the display panel and including a first filter lens and a second filter lens, orthographic projections of the first and second filter lenses on a light-emitting surface of the display panel do not overlap, and wavelength ranges of light that the first filter lens allows to transmit do not overlap with wavelength ranges of light that the second filter lens allows to transmit. Wavelength ranges of light for displaying the first image are within the wavelength ranges of the light that (Continued)

the first filter lens allows to transmit, and wavelength ranges of light for displaying the second image are within the wavelength ranges of the light that the second filter lens allows to transmit.

14 Claims, 7 Drawing Sheets

(56) References Cited

U.S. PATENT DOCUMENTS

| | | | |
|---|---|---|---|
| 2013/0063816 A1* | 3/2013 | Mathiassen | G02B 30/23 |
| | | | 359/464 |
| 2014/0285770 A1 | 9/2014 | Richards et al. | |
| 2014/0368625 A1* | 12/2014 | Lin | H04N 13/341 |
| | | | 348/60 |
| 2016/0173860 A1 | 6/2016 | Wang et al. | |

FOREIGN PATENT DOCUMENTS

| | | |
|---|---|---|
| CN | 103149694 A | 6/2013 |
| CN | 104460019 A | 3/2015 |
| CN | 106534837 A | 3/2017 |
| KR | 20150039066 A | 4/2015 |
| TW | 201447379 A | 12/2014 |

* cited by examiner

DISPLAY APPARATUS AND DISPLAY METHOD

CROSS-REFERENCE TO RELATED APPLICATION

This application claims priority to Chinese Patent Application No. 201810368736.2, filed with the Chinese Patent Office on Apr. 23, 2018, titled "DISPLAY APPARATUS AND DISPLAY METHOD", which is incorporated herein by reference in its entirety.

TECHNICAL FIELD

The present disclosure relates to the field of stereoscopic display technologies, and in particular, to a display apparatus and a display method.

BACKGROUND

Virtual Reality (abbreviated as VR) technology is a computer simulation technology through which a virtual world can be created and experienced. The VR technology uses a computer to generate an interactive three-dimensional dynamic view, and a simulation system of a product using the VR technology can immerse users in an environment of the three-dimensional dynamic view, and the VR technology has characteristics of multi-perception, presence, interactivity and autonomy.

SUMMARY

In an aspect, a display apparatus is provided. The display apparatus includes a display panel configured to output light for displaying a mixed image including a first image and a second image, and a filter device disposed at a light exit side of the display panel. The filter device includes a first filter lens and a second filter lens, an orthographic projection of the first filter lens on a light-emitting surface of the display panel does not overlap with an orthographic projection of the second filter lens on the light-emitting surface of the display panel, and wavelength ranges of light that the first filter lens allows to transmit do not overlap with wavelength ranges of light that the second filter lens allows to transmit. Wavelength ranges of light for displaying the first image are within the wavelength ranges of the light that the first filter lens allows to transmit, and wavelength ranges of light for displaying the second image are within the wavelength ranges of the light that the second filter lens allows to transmit.

In some embodiments, the display panel includes a plurality of first pixels configured to output the light for displaying the first image, and a plurality of second pixels configured to output the light for displaying the second image.

In some embodiments, the wavelength ranges of the light for displaying the first image include wavelength ranges of light of a plurality of colors. Each first pixel includes a plurality of first sub-pixels, and the plurality of first sub-pixels are configured to output light, wavelength ranges of which are the same as the wavelength ranges of the light of the plurality of colors included in the wavelength ranges of the light for displaying the first image in one-to-one correspondence. The wavelength ranges of the light for displaying the second image include wavelength ranges of light of a plurality of colors. Each second pixel includes a plurality of second sub-pixels, and the plurality of second sub-pixels are configured to output light, wavelength ranges of which are the same as the wavelength ranges of the light of the plurality of colors included in the wavelength ranges of the light for displaying the second image in one-to-one correspondence.

In some embodiments, the wavelength ranges of the light for displaying the first image include a wavelength range of first red light, a wavelength range of first green light and a wavelength range of first blue light. Each first pixel includes a first red sub-pixel, a first green sub-pixel and a first blue sub-pixel. The first red sub-pixel is configured to output light, a wavelength range of which is the wavelength range of the first red light. The first green sub-pixel is configured to output light, a wavelength range of which is the wavelength range of the first green light. The first blue sub-pixel is configured to output light, a wavelength range of which is the wavelength range of the first blue light. The wavelength ranges of the light for displaying the second image include a wavelength range of second red light, a wavelength range of second green light and a wavelength range of second blue light. Each second pixel includes a second red sub-pixel, a second green sub-pixel and a second blue sub-pixel. The second red sub-pixel is configured to output light, a wavelength range of which is the wavelength range of the second red light. The second green sub-pixel is configured to output light, a wavelength range of which is the wavelength range of the second green light. The second blue sub-pixel is configured to output light, a wavelength range of which is the wavelength range of the second blue light.

In some embodiments, each first pixel includes a plurality of first filter portions, and each second pixel includes a plurality of second filter portions. A wavelength range of light that each first filter portion allows to transmit is within the wavelength ranges of the light that the first filter lens allows to transmit, and a wavelength range of light that each second filter portion allows to transmit is within the wavelength ranges of the light that the second filter lens allows to transmit.

In some embodiments, each first pixel includes a plurality of first light-emitting devices, and each second pixel includes a plurality of second light-emitting devices. Each first light-emitting device is configured to emit light, a wavelength range of which is within the wavelength ranges of the light that the first filter lens allows to transmit. Each second light-emitting device is configured to emit light, a wavelength range of which is within the wavelength ranges of the light that the second filter lens allows to transmit.

In some embodiments, the plurality of first pixels and the plurality of second pixels are alternately arranged in a row direction of arranging the first and second pixels, and one of the second pixels is disposed between each adjacent two first pixels.

In some embodiments, the first filter lens includes a first lens and a first filter layer disposed on a surface of the first lens, and the first filter layer includes a plurality of first filter units. The second filter lens includes a second lens and a second filter layer disposed on a surface of the second lens, and the second filter layer includes a plurality of second filter units. Wavelength ranges of light that the plurality of first filter units allow to transmit do not overlap with wavelength ranges of light that the plurality of second filter units allow to transmit. The wavelength ranges of the light for displaying the first image are within the wavelength ranges of the light that the plurality of first filter units allow to transmit, and the wavelength ranges of the light for displaying the second image are within the wavelength ranges of the light that the plurality of second filter units allow to transmit.

In some embodiments, the wavelength ranges of the light for displaying the first image include wavelength ranges of light of a plurality of colors. Each first filter unit includes a plurality of first sub-filter units, and the wavelength ranges of the light of the plurality of colors included in the wavelength ranges of the light for displaying the first image are within wavelength ranges of light that the plurality of first sub-filter units allow to transmit in one-to-one correspondence. The wavelength ranges of the light for displaying the second image include wavelength ranges of light of a plurality of colors. Each second filter unit includes a plurality of second sub-filter units, and the wavelength ranges of the light of the plurality of colors included in the wavelength ranges of the light for displaying the second image are within wavelength ranges of light that the plurality of second sub-filter units allow to transmit in one-to-one correspondence.

In some embodiments, the wavelength ranges of the light for displaying the first image include a wavelength range of first red light, a wavelength range of first green light and a wavelength range of first blue light. Each first filter unit includes a first red sub-filter unit, a first green sub-filter unit and a first blue sub-filter unit. The wavelength range of the first red light is within a wavelength range of light that the first red sub-filter unit allows to transmit, the wavelength range of the first green light is within a wavelength range of light that the first green sub-filter unit allows to transmit, and the wavelength range of the first blue light is within a wavelength range of light that the first blue sub-filter unit allows to transmit. The wavelength ranges of the light for displaying the second image include a wavelength range of second red light, a wavelength range of second green light and a wavelength range of second blue light. Each second filter unit includes a second red sub-filter unit, a second green sub-filter unit and a second blue sub-filter unit. The wavelength range of the second red light is within a wavelength range of light that the second red sub-filter unit allows to transmit, the wavelength range of the second green light is within a wavelength range of light that the second green sub-filter unit allows to transmit, and the wavelength range of the second blue light is within a wavelength range of light that the second blue sub-filter unit allows to transmit.

In some embodiments, the first filter layer and the second filter layer include interference filter films respectively.

In some embodiments, the first filter layer is disposed on a surface of the first lens away from the display panel, and the second filter layer is disposed on a surface of the second lens away from the display panel. Alternatively, the first filter layer is disposed on a surface of the first lens close to the display panel, and the second filter layer is disposed on a surface of the second lens close to the display panel.

In some embodiments, a distance between the light-emitting surface of the display panel and a first cross-section of the first filter lens in a direction perpendicular to the light-emitting surface is smaller than a focal length of the first filter lens, and the first cross-section passes through an optical center of the first filter lens and is parallel to the light-emitting surface of the display panel. A distance between the light-emitting surface of the display panel and a second cross-section of the second filter lens in the direction perpendicular to the light-emitting surface is smaller than a focal length of the second filter lens, and the second cross-section passes through an optical center of the second filter lens and is parallel to the light-emitting surface of the display panel.

In another aspect, a display method is provided, and the display method is applied to the display apparatus described above. The display method includes: outputting, by the display panel of the display apparatus, light for displaying the mixed image including the first image and the second image; filtering, by the first filter lens of the display apparatus, light for displaying the mixed image, so that the light for displaying the first image included in the mixed image transmits the first filter lens; and filtering, by the second filter lens of the display apparatus, the light for displaying the mixed image, so that the light for displaying the second image included in the mixed image transmits the second filter lens.

In yet another aspect, a non-transitory computer-readable storage medium is provided. The non-transitory computer-readable storage medium stores executable instructions that, when executed by a display apparatus, cause the display apparatus to perform the display method.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
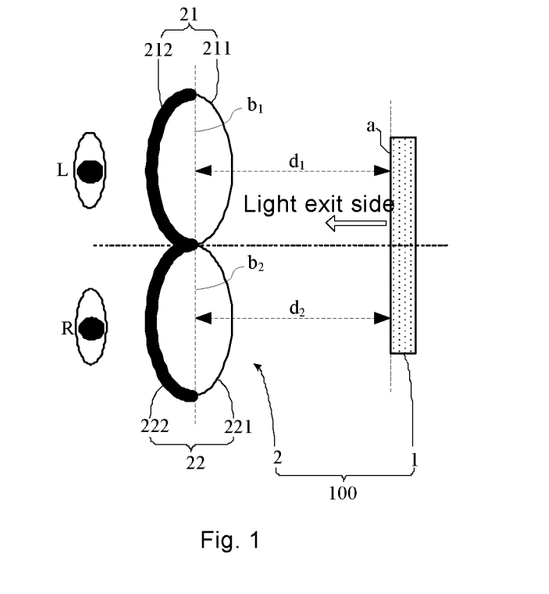
FIG. 1 is a schematic diagram showing a structure of a display apparatus in accordance with some embodiments of the present disclosure.
Figure 2:
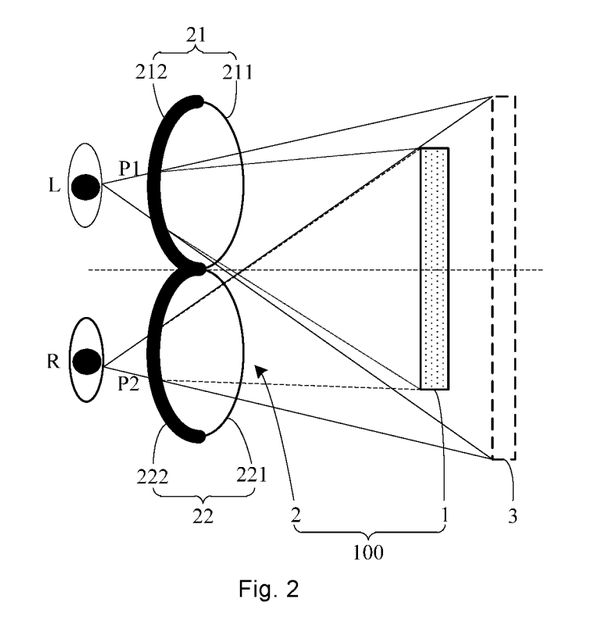
FIG. 2 is a diagram showing a display principle of a display apparatus in accordance with some embodiments of the present disclosure.
Figure 3:
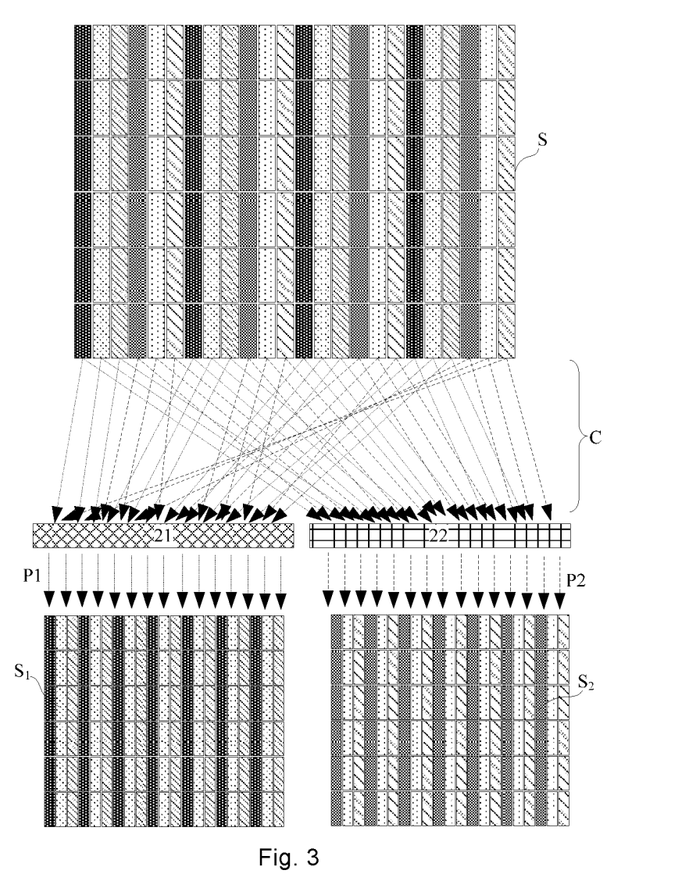
FIG. 3 is a diagram showing a light path of a display apparatus for displaying in accordance with some embodiments of the present disclosure.

With reference to FIGS. 1-3, some embodiments of the present disclosure provide a display apparatus 100, and the display apparatus 100 includes a display panel 1 and a filter device 2 disposed at a light exit side of the display panel 1. The filter device 2 includes a first filter lens 21 and a second filter lens 22. An orthographic projection of the first filter lens 21 on a light-emitting surface a of the display panel 1 does not overlap with an orthographic projection of the second filter lens 22 on the light-emitting surface a of the display panel 1. For example, the first filter lens 21 and the second filter lens 22 are arranged side by side at the light exit side of the display panel 1, the first filter lens 21 corresponds to a left eye L of a user, and the second filter lens 22 corresponds to a right eye R of the user. Wavelength ranges of light that the first filter lens 21 allows to transmit do not overlap with wavelength ranges of light that the second filter lens 22 allows to transmit.

The display panel 1 is configured to output light for displaying a mixed image S, and the mixed image S includes a first image $S_1$ and a second image $S_2$. Wavelength ranges of light for displaying the first image $S_1$ are within the wavelength ranges of the light that the first filter lens 21 allows to transmit, and wavelength ranges of light for displaying the second image $S_2$ are within the wavelength ranges of the light that the second filter lens 22 allows to transmit.

With continued reference to FIGS. 2 and 3 again, a display process of the display apparatus 100 is as follows. The display panel 1 outputs the light for displaying the mixed image S including the first image $S_1$ and the second image $S_2$. The first filter lens 21 filters light C for displaying the mixed image, and light P1 for displaying the first image $S_1$ included in the mixed image S transmits the first filter lens 21. The second filter lens 22 filters the light C for displaying the mixed image S, and light P2 for displaying the second image $S_2$ included in the mixed image S transmits the second filter lens 22.

Since the left eye L of the user corresponds to the first filter lens 21 and the right eye R of the user corresponds to the second filter lens 22, the light P1 for displaying the first image $S_1$ enters the left eye L to serve as the light for displaying a left-eye image, and the light P2 for displaying the second image $S_2$ enters the right eye R to serve as the light for displaying a right-eye image. In this way, it may be ensured that the first image $S_1$ (i.e., the left-eye image) and the second image $S_2$ (i.e., the right-eye image) are synthesized in the user's brain, thereby a stereoscopic image is observed.

It can be seen from the structure of the display apparatus 100 described above and the display process thereof that as shown in FIG. 3, when the first filter lens 21 and the second filter lens 22 receive the light C for displaying the mixed image S, the light P1 for displaying the first image $S_1$ may transmit the first filter lens 21, the light P2 for displaying the second image $S_2$ is unable to transmit the first filter lens 21, the light P2 for displaying the second image $S_2$ may transmit the second filter lens 22, and the light P1 for displaying the first image $S_1$ is unable to transmit the second filter lens 22.

As a result, the light C for displaying the mixed image S may be divided into two independent light beams, i.e., the light P1 for displaying the first image $S_1$ and the light P2 for displaying the second image $S_2$, respectively, and one of the two light beams enters the left eye L of the user, and another light beam enters the right eye R of the user. Since the left eye L of the user corresponds to the first filter lens 21 and the right eye R corresponds to the second filter lens 22, the light P1 for displaying the first image $S_1$ enters the left eye L, and the light P2 for displaying the second image $S_2$ enters the right eye R. The light P1 for displaying the first image $S_1$ and the light P2 for displaying the second image $S_2$ are reconstructed in the user's brain to generate a stereoscopic image.

It can be seen that the display apparatus 100 provided by some embodiments of the present disclosure can separate the light for displaying the mixed image S to form two light beams P1 and P2 that are independent of each other and do not interfere with each other to generate a stereoscopic image, so that there is no need to use two display screens in the display apparatus to display the left-eye image and the right-eye image, respectively, thereby avoiding providing a light barrier between the two display screens of the display apparatus, which is advantageous for simplifying the structure of the display apparatus and reducing a weight of the display apparatus.

Moreover, in the display apparatus provided by some embodiments of the present disclosure, since there is no occlusion of the light barrier, and thus a field of view between lines respectively connected edges of the display apparatus to an observation point is increased, the left eye L and the right eye R of the user can see the first image $S_1$ (i.e., the left-eye image) and the second image $S_2$ (i.e., the right-eye image) at a larger field of view, so that when the user's brain constructs the stereoscopic image, the first image $S_1$ and the second image $S_2$ have a higher degree of complementarity, thereby a stereoscopic image having a good stereoscopic effect may be constructed, so as to effectively improve a sense of immersion of the user when using the display apparatus 100.

In addition, in the related art, a VR display apparatus uses two screens to display the left-eye image and the right-eye image, respectively, and the two screens are required to be strictly aligned. For example, display surfaces of the two screens are required to be in a same plane, and the two screens are arranged in an axisymmetric manner, etc. In this way, it may be ensured that the stereoscopic image formed in the brain has a strong stereoscopic effect after the left-eye image and the right-eye image displayed on the two screens enter the user's eyes. However, the strict alignment of the two screens makes the fabrication precision and the installation precision of the VR display apparatus relatively high, and it is easy to increase the fabrication difficulty and the installation difficulty of the VR display apparatus.

The display apparatus 100 provided by some embodiments of the present disclosure provides the mixed image S including the first image $S_1$ and the second image $S_2$ by using the display panel 1, then the first filter lens 21 and the second filter lens 22 of the filter device 2 are used for filtering the light C for displaying the mixed image, so that the light P1 for displaying the first image $S_1$ enters the left eye L, and the light P2 for displaying the second image $S_2$ enters the right eye R. That is, the display apparatus 100 provided by the embodiments of the present disclosure uses one display panel 1, and there is no need to use two screens (i.e., two display panels). Therefore, there is no problem that the two screens are strictly aligned, thereby reducing the fabrication difficulty and the installation difficulty of the display apparatus.

With reference to FIG. 1 again, in some embodiments, a distance $d_1$ between the light-emitting surface a of the display panel 1 and a first cross-section $b_1$ (the first cross-section $b_1$ passes through an optical center of the first filter lens 21 and is parallel to the light-emitting surface a of the display panel 1) of the first filter lens 21 in a direction perpendicular to the light-emitting surface a of the display panel 1 is smaller than a focal length of the first filter lens 21, and a distance $d_2$ between the light-emitting surface a of the display panel 1 and a second cross-section $b_2$ (the second cross-section $b_2$ passes through the optical center of the second filter lens 22 and is parallel to the light-emitting surface a of the display panel 1) of the second filter lens 22 in the direction perpendicular to the the light-emitting surface a of the display panel 1 is smaller than a focal length of the second filter lens 22.

With reference to FIG. 2 again, since the display apparatus 100 can provide the mixed image S including the first image $S_1$ and the second image $S_2$ by using one display panel 1, the left eye L and the right eye R of the user are not occluded by the light barrier, thereby ensuring that the sight of the user covers the entire display panel 1. As a result, in a case where the distance $d_1$ between the light-emitting surface a of the display panel 1 and the first cross-section $b_1$ of the first filter lens 21 in the direction perpendicular to the light-emitting surface a is smaller than the focal length of the first filter lens 21 and the distance $d_2$ between the light-emitting surface a of the display panel 1 and the second cross-section $b_2$ of the second filter lens 22 in the direction perpendicular to the light-emitting surface a is smaller than the focal length of the second filter lens 22, the image seen by the left eye L and right eye R of the user is a virtual image 3, in which the left eye L sees a left-eye virtual image that enlarges the first image and has a depth of field, and the right eye R sees a right-eye virtual image that enlarges the second image and has a depth of field, which makes the stereoscopic image (i.e., the virtual image 3) constructed by the user's brain relatively clear and real.

In some embodiments, the display apparatus 100 have a structure in which the display panel 1 and the filter device 2 are integrated. For example, the display apparatus 100 is a VR head-mounted display apparatus. In some other embodiments, the display apparatus 100 have a structure in which the display panel 1 is separated from the filter device 2. For example, the display panel 1 is any product or component having a display function such as a mobile phone, a tablet computer, a television, a display, a notebook computer, a digital photo frame or a navigator, and the filter device 2 is provided as a portable eyeglass to the user to assist the user in viewing the image provided by the display panel 1.

In some embodiments, the first filter lens 21 and the second filter lens 22 included in the filter device 2 described above are connected by a connector, such as a frame. In some other embodiments, the first filter lens 21 and the second filter lens 22 included in the filter device 2 described above are fixed by a lens barrel. Since there is only one screen (i.e., the display panel 1) in the display apparatus 100, the lens barrel is not required to be extended to a middle of the display panel 1 as a light barrier.

The structure of the display panel 1 in the display apparatus 100 provided by some embodiments of the present disclosure will be illustratively described below.

Figure 4:
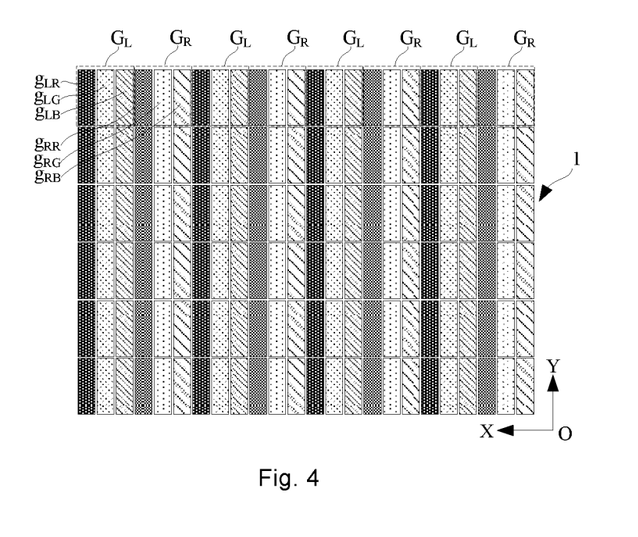
FIG. 4 is a schematic diagram showing an arrangement of pixels of a display panel in a display apparatus in accordance with some embodiments of the present disclosure.

As shown in FIG. 4, in some embodiments, the display panel 1 includes a plurality of first pixels $G_L$ and a plurality of second pixels $G_R$. The plurality of first pixels $G_L$ are configured to provide the first image $S_1$, and the plurality of second pixels $G_R$ are configured to provide the second image $S_2$. With continued reference to FIG. 4, In some examples, the plurality of first pixels $G_L$ and the plurality of second pixels $G_R$ are arranged in an array. A row direction in which pixels are arranged is an OX direction, and a column direction is an OY direction. The plurality of first pixels $G_L$ and the plurality of second pixels $G_R$ are alternately arranged in the row direction, i.e., the OX direction, and the plurality of first pixels $G_L$ are arranged in a column or the plurality of second pixels $G_R$ are arranged in a column in the column direction, i.e., the OY direction.

With continued reference to FIG. 4, in some embodiments, the wavelength ranges of the light for displaying the first image $S_1$ include wavelength ranges of light of a plurality of colors. Correspondingly, each first pixel $G_L$ includes a plurality of first sub-pixels $g_L$, and wavelength ranges of light emitted from the plurality of first sub-pixels $g_L$ are the same as the wavelength ranges of the light of the plurality of colors in one-to-one correspondence. The wavelength ranges of the light for displaying the second image $S_2$ include wavelength ranges of the light of a plurality of colors. Correspondingly, each second pixel $G_R$ includes a plurality of second sub-pixels $g_R$, and the wavelength ranges of light emitted from the plurality of second sub-pixels $g_R$ are the same as the wavelength ranges of the light of the plurality of colors included in the wavelength ranges of the light for displaying the second image $S_2$ in one-to-one correspondence.

In this way, a display of the first image $S_1$ may be achieved by using first sub-pixels $g_{LR}$ included in the display panel 1 for providing the light of the plurality of colors, and a display of the second image $S_2$ may be achieved by using second sub-pixels $g_R$ included in the display panel 1 for providing the light of the plurality of colors, thereby achieving the color display of the first image $S_1$ and the second image $S_2$, i.e., the color display of the display apparatus.

The wavelength ranges of the light for displaying the first image $S_1$ are within the wavelength ranges of the light that the first filter lens 21 allows to transmit, the wavelength ranges of the light for displaying the second image $S_2$ are within the wavelength ranges of the light that the second filter lens 22 allows to transmit, and the wavelength ranges of the light that the first filter lens 21 allows to transmit do not overlap with the wavelength ranges of the light that the second filter lens 22 allows to transmit. That is to say, any one of the wavelength ranges of the light of the plurality of colors for displaying the first image $S_1$ does not overlap with any one of the wavelength ranges of the light of the plurality of colors for displaying the second image $S_2$. That is to say, any one of the wavelength ranges of the light provided by the plurality of first sub-pixels $g_L$ included in each first pixel $G_L$ does not overlap with any one of the wavelength ranges of the light provided by the plurality of second sub-pixels $g_R$ included in each second pixel $G_R$, thereby ensuring that the light for displaying the first image $S_1$ and the light for displaying the second image $S_2$ may independently enter the left eye L and the right eye R of the user, respectively.

Figure 5:
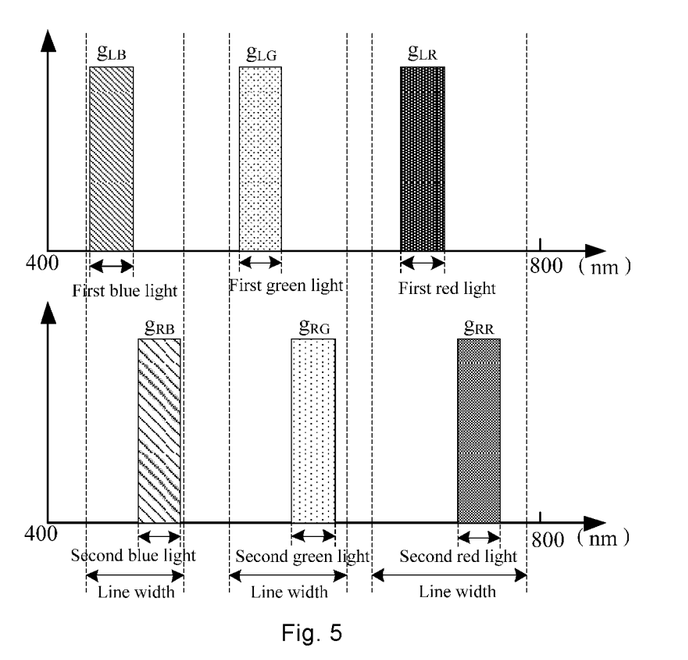
FIG. 5 is a diagram showing wavelength ranges of light of sub-pixels of a display panel in a display apparatus in accordance with some embodiments of the present disclosure.

In some embodiments, with reference to FIGS. 4 and 5, the wavelength ranges of the light for displaying the first image $S_1$ include a wavelength range of first red light, a wavelength range of first green light and a wavelength range of first blue light. Each first pixel $G_L$ includes a first red sub-pixel $g_{LR}$, a first green sub-pixel $g_{LG}$ and a first blue sub-pixel $g_{LB}$. The first red sub-pixel $g_{LR}$ is configured to output light, a wavelength range of which is the wavelength range of the first red light. The first green sub-pixel $g_{LG}$ is configured to output light, a wavelength range of which is the wavelength range of the first green light. The first blue sub-pixel $g_{LB}$ is configured to output light, a wavelength range of which is the wavelength range of the first blue light.

The wavelength ranges of the light for displaying the second image $S_2$ include a wavelength range of second red light, a wavelength range of second green light and a wavelength range of second blue light. Each second pixel $G_R$ includes a second red sub-pixel $g_{RR}$, a second green sub-pixel $g_{RG}$ and a second blue sub-pixel $g_{RB}$. The second red sub-pixel $g_{RR}$ is configured to output light, a wavelength range of which is the wavelength range of the second red light. The second green sub-pixel $g_{RG}$ is configured to output light, a wavelength range of which is the wavelength range of the second green light. The second blue sub-pixel $g_{RB}$ is configured to output light, a wavelength range of which is the wavelength range of the second blue light.

In this way, the first image $S_1$ is displayed by using the first red sub-pixel $g_{LR}$, the first green sub-pixel $g_{LG}$ and the first blue sub-pixel $g_{LB}$ included in each first pixel $G_L$ for providing the red, green and blue light, respectively, and the second image $S_2$ is displayed by using the second red sub-pixel $g_{RR}$, the second green sub-pixel $g_{RG}$ and the second blue sub-pixel $g_{RB}$ included in each second pixel $G_R$ for providing the red, green and blue light, respectively, thereby achieve a full color display of the first image $S_1$ and the second image $S_2$.

With reference to FIG. 5, the wavelength range of the first red light and the wavelength range of the second red light are selected from a wavelength range of red light in a wavelength range of visible light (400-800 nm). That is, the wavelength range of the light provided by the first red sub-pixel $g_{LR}$ and the wavelength range of the light provided by the second red sub-pixel $g_{RR}$ are selected from the wavelength range of the red light, and do not overlap. The wavelength range of the first green light and the wavelength range of the second green light are selected from a wavelength range of green light in the wavelength range of the visible light (400-800 nm). That is, the wavelength range of the light provided by the first green sub-pixel $g_{LG}$ and the wavelength range of the light provided by the second green sub-pixel $g_{RG}$ are selected from the wavelength range of the green light, and do not overlap. The wavelength range of the first blue light and the wavelength range of the second blue light are selected from a wavelength range of blue light in the wavelength range of the visible light (400-800 nm). That is, the wavelength range of the light provided by the first blue sub-pixel $g_{LB}$ and the wavelength range of the light provided by the second blue sub-pixel $g_{RB}$ are selected from the wavelength range of the blue light, and do not overlap. In this way, it may be ensured that the light for displaying the first image $S_1$ and the light for displaying the second image $S_2$ may independently enter the left eye L and the right eye R of the user, respectively.

Figure 6:
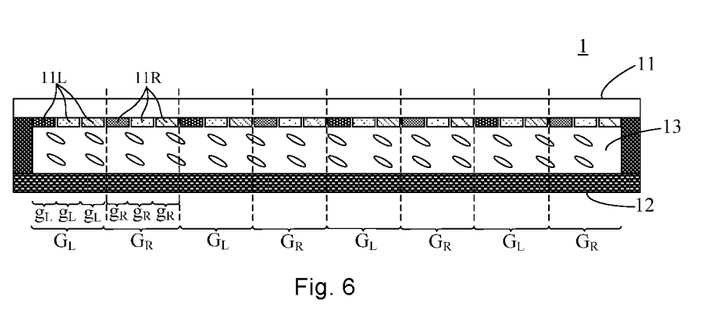
FIG. 6 is a cross section diagram of a part of a LCD display panel in a display apparatus in accordance with some embodiments of the present disclosure.
Figure 7:
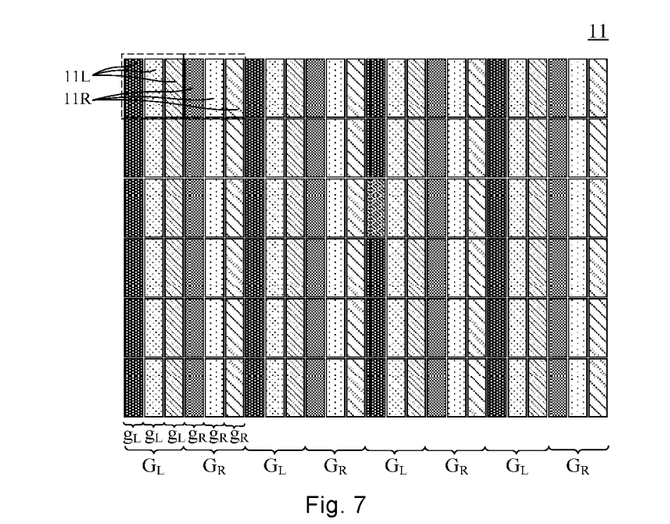
FIG. 7 is a plan view showing a structure of a color film substrate in the LCD display panel shown in FIG. 6.

In some embodiments, with reference to FIGS. 6 and 7, the display panel 1 is a liquid crystal display (LCD) panel, and the LCD panel includes a color film substrate 11 and an array substrate 12 that are disposed opposite to each other. The color film substrate 11 includes a base substrate and a color filer layer disposed on a surface of the base substrate close to the array substrate 12. The color filter layer includes a plurality of filter portions, and the plurality of filter portions filter the light transmitting the array substrate 12, respectively, so that the wavelength ranges of the light provided by the plurality of first pixels $G_L$ in the display panel 1 and for displaying the first image $S_1$ are within the wavelength ranges of the light that the first filter lens 21 allows to transmit, and the wavelength ranges of the light provided by the plurality of second pixels $G_R$ in the display panel 1 and for displaying the second image $S_2$ are within the wavelength ranges of the light that the second filter lens 22 allows to transmit.

In some embodiments, with reference to FIGS. 6 and 7 again, each first pixel $G_L$ includes a plurality of first filter portions 11L, and each second pixel $G_R$ includes a plurality of second filter portions 11R. A wavelength range of light that each first filter portion 11L allows to transmit is within the wavelength ranges of the light that the first filter lens 21 allows to transmit, and a wavelength range of light that each second filter portion 11R allows to transmit is within the wavelength ranges of the light that the second filter lens 22 allows to transmit, thereby ensuring that the light for displaying the first image $S_1$ and the light for displaying the second image $S_2$ may independently enter the left eye L and the right eye R of the user, respectively, thereby achieving the display of the mixed image S including the first image $S_1$ and the second image $S_2$ by the display panel 1.

In some embodiments, each first pixel $G_L$ includes a plurality of first sub-pixels $g_L$, and the plurality of first filter portions 11L are arranged in one-to-one correspondence with the plurality of first sub-pixels $g_L$, that is, each first sub-pixel $g_L$ includes a first filter portion 11L. Similarly, each second pixel $G_R$ includes a plurality of second sub-pixels $g_R$, and the plurality of second filter portions 11R are arranged in one-to-one correspondence with the plurality of second sub-pixels $g_R$, that is, each second sub-pixel $g_R$ includes a second filter portion 11R. The wavelength range of the light that each first filter portion 11L allows to transmit is the same as the wavelength range of the light required to be provided by a corresponding first sub-pixel $g_L$ to which the first filter portion 11L belongs, and the wavelength range of the light that each second filter portion 11R allows to transmit is the same as the wavelength range of the light required to be provided by a corresponding second sub-pixel $g_R$ to which the second filter portion 11R belongs, so that each first sub-pixel $g_L$ and each second sub-pixel $g_R$ may provide the light that satisfies respective required wavelength ranges.

For example, each first pixel $G_L$ includes a first red sub-pixel $g_{LR}$, a first green sub-pixel $g_{LG}$ and a first blue sub-pixel $g_{LB}$. The wavelength range of the light required to be provided by the first red sub-pixel $g_{LR}$ is the wavelength range of the first red light, the wavelength range of the light required to be provided by the first green sub-pixel $g_{LG}$ is the wavelength range of the first green light, and the wavelength range of the light required to be provided by the first blue sub-pixel $g_{LB}$ is the wavelength range of the first blue light. The first red sub-pixel $g_{LR}$ includes a first red filter portion, and the wavelength range of light that the first red filter portion allows to transmit is the wavelength range of the first red light. The first green sub-pixel $g_{LG}$ includes a first green filter portion, and the wavelength range of light that the first green filter portion allows to transmit is the wavelength range of the first green light. The first blue sub-pixel $g_{LB}$ includes a first blue filter portion, and the wavelength range of light that the first blue filter portion allows to transmit is the wavelength range of the first blue light.

Similarly, each second pixel $G_R$ includes a second red sub-pixel $g_{RR}$, a second green sub-pixel $g_{RG}$ and a second blue sub-pixel $g_{RB}$. The wavelength range of the light required to be provided by the second red sub-pixel $g_{RR}$ is the wavelength range of the second red light, the wavelength range of the light required to be provided by the second green sub-pixel $g_{RG}$ is the wavelength range of the second green light, and the wavelength range of the light required to be provided by the second blue sub-pixel $g_{RB}$ is the wavelength range of the second blue light. The second red sub-pixel $g_{RR}$ includes a second red filter portion, and the wavelength range of light that the second red filter portion allows to transmit is the wavelength range of the second red light. The second green sub-pixel $g_{RG}$ includes a second green filter portion, and the wavelength range of light that the second green filter portion allows to transmit is the wavelength range of the second green light. The second blue sub-pixel $g_{RB}$ includes a second blue filter portion, and the wavelength range of light that the second blue filter portion allows to transmit is the wavelength range of the second blue light.

In some embodiments, areas of each first filter portion 11L and each second filter portion 11R are configured to be relatively small, so that a matching between the first image $S_1$ and the second image $S_2$ may be improved, and a fineness and the stereoscopic effect of the stereoscopic image formed by the first image $S_1$ and the second image $S_2$ may be improved. For example, the area of each first filter portion 11L is an area of one first sub-pixel $g_L$ or an area of one column of the first sub-pixels $g_L$, and the area of each second filter portion 11R is an area of one second sub-pixel $g_R$ or an area of one column of the second sub-pixels $g_R$, thereby well improving the fineness and stereoscopic effect of the stereoscopic image.

It will be noted that during an operation of the display panel 1, a display signal received by the display panel 1 is a display signal of an initial image, that is, the display panel 1 is configured to convert the initial image into the mixed image S including the first image $S_1$ and the second image $S_2$ and display the mixed image S. For example, the initial image is a gray scale image. When light for displaying the initial image transmits the color film substrate 11 of the display panel 1, each first filter portion 11L in the color film substrate 11 filters the light for displaying the initial image, and only allows the light for displaying the first image $S_1$ to transmit to form the first image $S_1$. In addition, each second filter portion 11R in the color film substrate 11 filters the light for displaying the initial image, and only allows the light for displaying the second image $S_2$ to transmit to form the second image $S_2$. Then the light for displaying the initial image may be combined and the display panel 1 provides the mixed image S composed of the first image $S_1$ and the second image $S_2$.

On this basis, in some embodiments, in a case where the wavelength range of the light that each first filter portion 11L allows to transmit and the wavelength range of the light that each second filter portion 11R allows to transmit are set, the wavelength ranges of the light for displaying the initial image are within the wavelength ranges of the light that the first filter portions 11L allow to transmit and the wavelength ranges of the light that the second filter portions 11R allow to transmit, so that the light for displaying the initial image transmits the first filter portions 11L and the second filter portions 11R as much as possible, thereby reducing a light loss, which is advantageous for improving an authenticity of the image displayed on the display panel 1.

With reference to FIG. 6 again, the LCD panel further includes a liquid crystal layer 13 disposed between the array substrate 12 and the color film substrate 11, and a backlight module configured to provide the light required for displaying an image. In some examples, a light source of the backlight module includes at least one monochromatic light-emitting diode (LED) light source. In this case, a monochromatic LED light source having a narrow line width is selected, which may effectively ensure that the wavelength ranges of the light for displaying the initial image are within the wavelength ranges of the light that the first filter portions 11L allow to transmit and the wavelength ranges of the light that the second filter portions 11R allow to transmit. For example, the light source of the backlight module includes monochromatic LED light sources each with a line width of less than 20 nm. In some other examples, the light source of the backlight module includes at least one laser light source. The arrangement of the at least one LED light source or the at least one laser light source, and the colors of light emitted by the at least one LED light source or the at least one laser light source may be set according to actual requirements.

As mentioned above, the display panel 1 is a LCD panel, and the LCD panel 1 includes the color film substrate 11 and the array substrate 12 that are disposed opposite to each other. This structure is merely an exemplary structure according to some embodiments, and the display panel 1, as an LCD panel, can adopt other structures. For example, the LCD panel 1 includes only one substrate having functions of the array substrate 12 and the color film substrate 11, that is, the substrate includes a pixel driving circuit of the array substrate 12 and a color filter layer of the color film substrate 11. This substrate is referred to as a color filter on array (COA) substrate. In a case where the display panel 1 includes the COA substrate, a method of arranging the filter portions in the color filter layer may refer to the description described above with regard to the arrangement of the filter portions.

Of course, in addition to the LCD panel described above, the display panel 1 may also be a display panel having an active light-emitting function, such as an organic light-emitting diode (OLED) display panel. In some embodiments, with reference to FIGS. 8 and 9, the display panel 1 is an active light-emitting display panel, and the active light-emitting display panel includes an array substrate 12' including a plurality of first pixels $G_L$ and a plurality of second pixels $G_R$. Each first pixel $G_L$ includes a plurality of first light-emitting devices 12L', and each second pixel $G_R$ includes a plurality of second light-emitting device 12R'. Each first light-emitting device 12L' is configured to emit light, a wavelength range of which is within the wavelength ranges of the light that the first filter lens 21 allows to transmit. Each second light-emitting device 12R' is configured to emit light, a wavelength range of which is within the wavelength ranges of the light that the second filter lens 22 allows to transmit, thereby ensuring that the light provided by the plurality of first pixels $G_L$ and for displaying the first image $S_1$ and the light provided by the plurality of second pixels $G_R$ and for displaying the second image $S_2$ may independently enter the left eye L and the right eye R of the user, respectively, thereby achieving the display of the mixed image S including the first image $S_1$ and the second image $S_2$ by the display panel 1.

Figure 8:
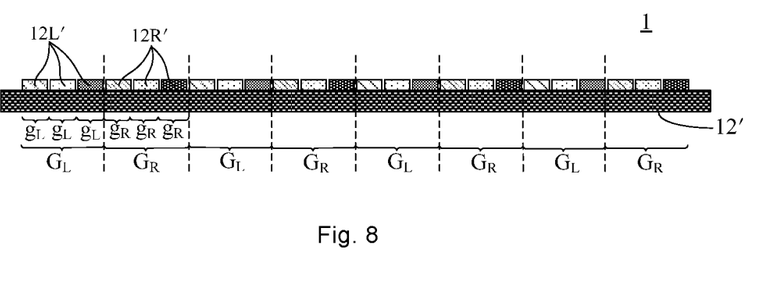
FIG. 8 is a cross section diagram of an active light-emitting display panel in a display apparatus in accordance with some embodiments of the present disclosure.
Figure 9:
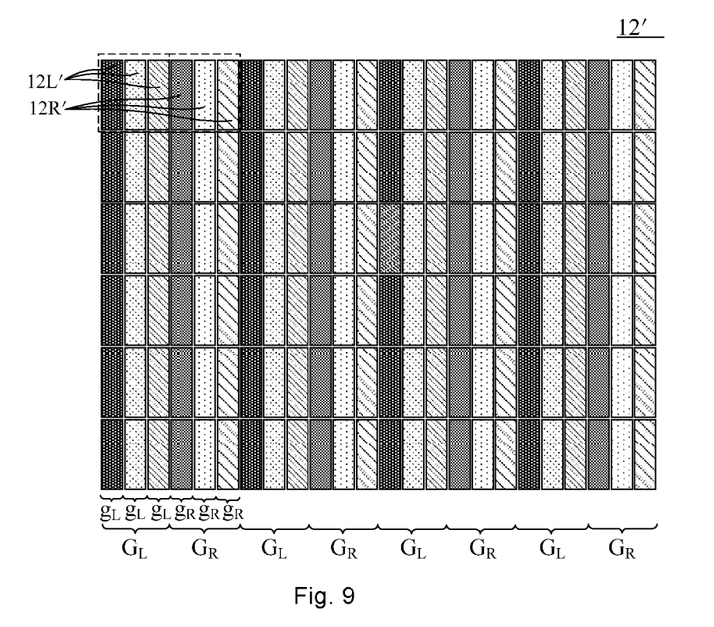
FIG. 9 is a plan view of an array substrate in the active light-emitting display panel shown in FIG. 8 in accordance with some embodiments of the present disclosure.

With continued reference to FIGS. 8 and 9, in some embodiments, each first pixel $G_L$ includes a plurality of first sub-pixels $g_L$, and the plurality of first light-emitting devices 12L' are arranged in one-to-one correspondence with the plurality of first sub-pixels $g_L$, that is, each first sub-pixel $g_L$ includes a first light-emitting device 12L'. Similarly, each second pixel $G_R$ includes a plurality of second sub-pixels $g_R$, and the plurality of second light-emitting devices 12R' are arranged in one-to-one correspondence with the plurality of second sub-pixels $g_R$, that is, each second sub-pixel $g_R$ includes a second light-emitting device 12R'. The wavelength range of the light emitted by each first light-emitting device 12L' is the same as the wavelength range of the light required to be provided by a corresponding first sub-pixel $g_L$ to which the first light-emitting device 12L' belongs, and the wavelength range of the light emitted by each second light-emitting device 12R' is the same as the wavelength range of the light required to be provided by a corresponding second sub-pixel $g_R$ to which the second light-emitting device 12R' belongs, so that the first sub-pixels $g_L$ and the second sub-pixels $g_R$ may provide the light that satisfies the required wavelength ranges.

For example, each first pixel $G_L$ includes a first red sub-pixel $g_{LR}$, a first green sub-pixel $g_{LG}$ and a first blue sub-pixel $g_{LB}$. The wavelength range of the light required to be provided by the first red sub-pixel $g_{LR}$ is the wavelength range of the first red light, the wavelength range of the light required to be provided by the first green sub-pixel $g_{LG}$ is the wavelength range of the first green light, and the wavelength range of the light required to be provided by the first blue sub-pixel $g_{LB}$ is the wavelength range of the first blue light. The first red sub-pixel $g_{LR}$ includes a first red light-emitting device, and the wavelength range of light emitted by the first red light-emitting device is the wavelength range of the first red light. The first green sub-pixel $g_{LG}$ includes a first green light-emitting device, and the wavelength range of light emitted by the first green light-emitting device is the wavelength range of the first green light. The first blue sub-pixel $g_{LB}$ includes a first blue light-emitting device, and the wavelength range of light emitted by the first blue light-emitting device is the wavelength range of the first blue light.

Similarly, each second pixel $G_R$ includes a second red sub-pixel $g_{RR}$, a second green sub-pixel $g_{RG}$ and a second blue sub-pixel $g_{RB}$. The wavelength range of the light required to be provided by the second red sub-pixel $g_{RR}$ is the wavelength range of the second red light, the wavelength range of the light required to be provided by the second green sub-pixel $g_{RG}$ is the wavelength range of the second green light, and the wavelength range of the light required to be provided by the second blue sub-pixel $g_{RB}$ is the wavelength range of the second blue light. The second red sub-pixel $g_{RR}$ includes a second red light-emitting device, and the wavelength range of light emitted by the second red light-emitting device is the wavelength range of the second red light. The second green sub-pixel $g_{RG}$ includes a second green light-emitting device, and the wavelength range of light emitted by the second green light-emitting device is the wavelength range of the second green light. The second blue sub-pixel $g_{RB}$ includes a second blue light-emitting device, and the wavelength range of light emitted by the second blue light-emitting device is the wavelength range of the second blue light.

In some embodiments, with reference to FIGS. 1 and 10-12, the first filter lens 21 includes a first lens 211 and a first filter layer 212 disposed on a surface of the first lens 211, and the first filter layer 212 includes a plurality of first filter units 212L. The second filter lens 22 includes a second lens 221 and a second filter layer 222 disposed on a surface of the second lens 221, and the second filter layer 222 includes a plurality of second filter units 222R. Wavelength ranges of light that the plurality of first filter units 212L allow to transmit do not overlap with wavelength ranges of light that the plurality of second filter units 222R allow to transmit. The wavelength ranges of the light for displaying the first image are within the wavelength ranges of the light that the plurality of first filter units 212L allow to transmit, so that the light P1 for displaying the first image included in the mixed image transmits the plurality of first filter units 212L and enters the left eye L of the user as the light for displaying the left-eye image. The wavelength ranges of the light for displaying the second image are within the wavelength ranges of the light that the plurality of second filter units 222R allow to transmit, so that the light P2 for displaying the second image included in the mixed image transmits the plurality of second filter units 222R and enters the right eye R of the user as the light for displaying the right-eye image.

Figure 10:
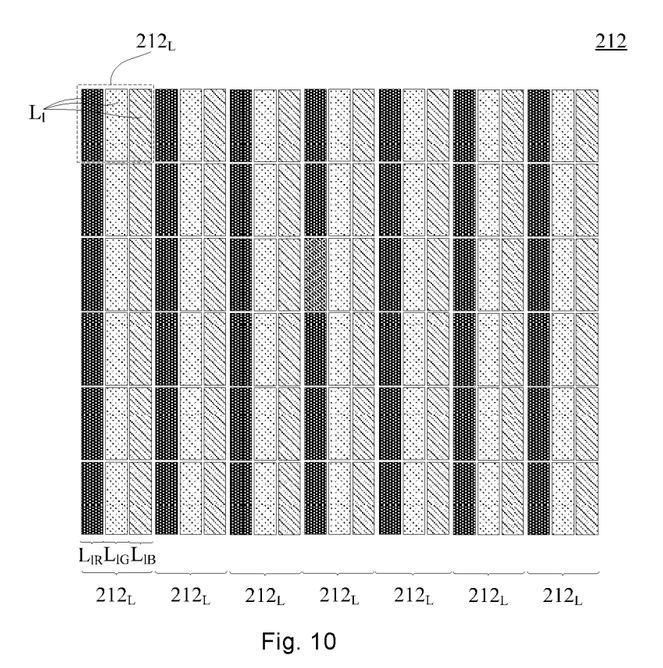
FIG. 10 is a schematic diagram showing a structure of a first filter layer in a display apparatus in accordance with some embodiments of the present disclosure.
Figure 11:
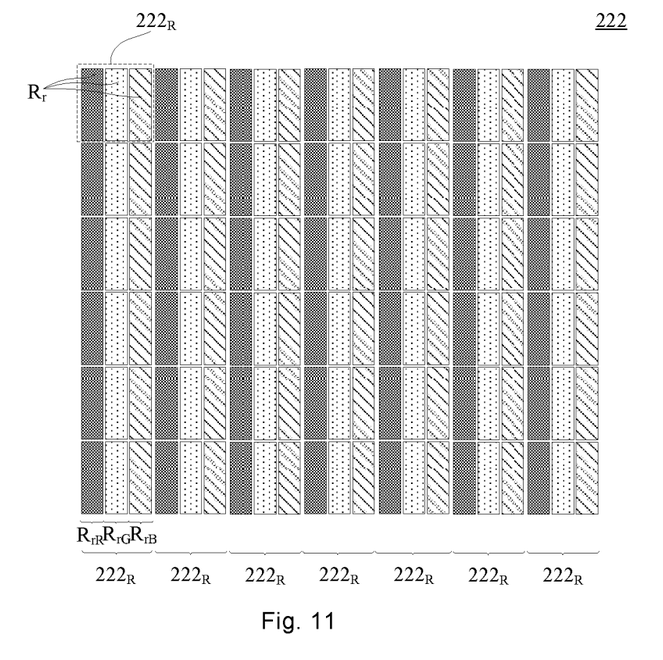
FIG. 11 is a schematic diagram showing a structure of a second filter layer in a display apparatus in accordance with some embodiments of the present disclosure.
Figure 12:
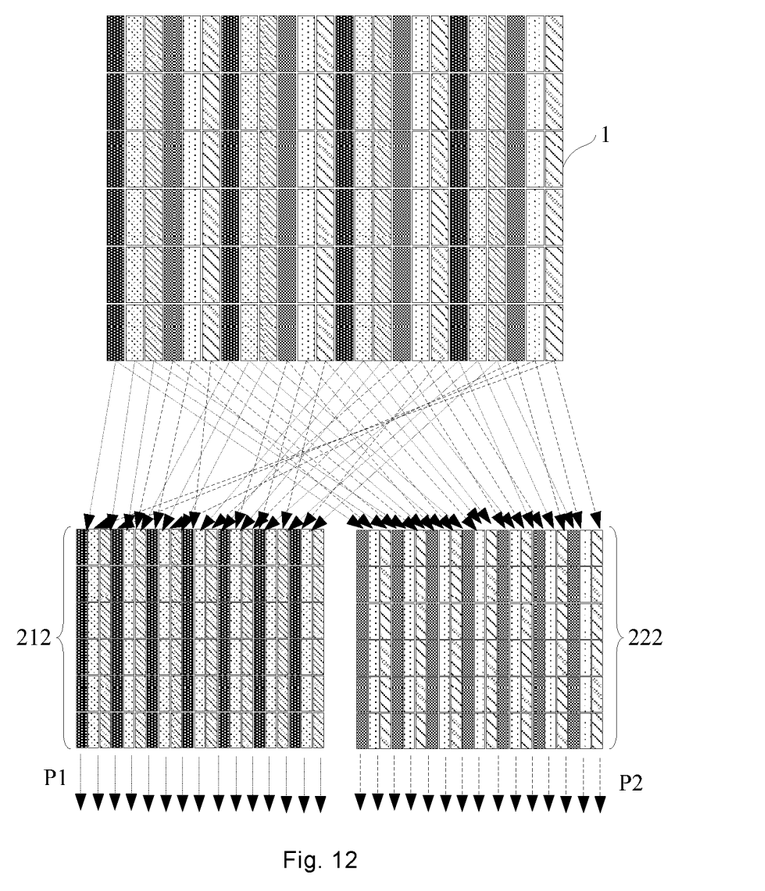
FIG. 12 is a diagram showing a filtering principle of a display apparatus in accordance with some embodiments of the present disclosure.

Optionally, the first filter layer 212 and the second filter layer 222 are interference filter films. It will be noted that the interference filter film that is configured to form the first filter layer 212 and the interference filter film that is configured to form the second filter layer 222 have different filtering effects.

In addition, the first filter layer 212 and the second filter layer 222 are disposed on surfaces of respective lens, which may be as follows. The first filter layer 212 is disposed on a surface of the first lens 211 away from the display panel 1, and the second filter layer 222 is disposed on a surface of the second lens 221 away from the display panel 1. Alternatively, the first filter layer 212 is disposed on a surface of the first lens 211 close to the display panel 1, and the second filter layer 222 is disposed on a surface of the second lens 221 close to the display panel 1.

In the case where the first filter layer 212 is disposed on the surface of the first lens 211 away from the display panel 1, the light P1 for displaying the first image in the mixed image will first transmit the first lens 211 and then transmit the first filter layer 212, so that the filtered light for displaying the first image directly enters the left eye of the user, thereby avoiding the problem of changing optical properties of the light caused by the light transmitting other optical elements. That is, the wavelength ranges of the filtered light for displaying the first image will not be changed due to optical interferences of other optical elements. Similarly, in the case where the second filter layer 222 is disposed on the surface of the second lens 221 away from the display panel 1, the light P2 for displaying the second image in the mixed image will first transmit the second lens 221 and then transmit the second filter layer 222, so that the filtered light for displaying the second image directly enters the right eye of the user, thereby avoiding the problem of changing the optical properties of the light caused by the light transmitting other optical elements.

In a case where the display apparatus is configured to display a color image, in the light provided by the display panel and for displaying the mixed image, the wavelength ranges of the light for displaying the first image and the wavelength ranges of the light for displaying the second image include wavelength ranges of the light of a plurality of colors, respectively. Based on this, in some embodiments, with continued reference to FIG. 10, each first filter unit 212L of the first filter layer 212 includes a plurality of first sub-filter units L1, and the wavelength ranges of the light of the plurality of color included in the wavelength ranges of the light for displaying the first image are within the wavelength ranges of the light that the plurality of first sub-filter units L1 allow to transmit in one-to-one correspondence. That is, in each first filter unit 212L, the wavelength range of the light that one of the first sub-filter units L1 allows to transmit corresponds to the wavelength range of the light of one color included in the light for displaying the first image. With continued reference to FIG. 11, each second filter unit 222R of the second filter layer 222 includes a plurality of second sub-filter units Rr, and the wavelength ranges of the light of the plurality of color included in the wavelength ranges of the light for displaying the second image are within the wavelength ranges of the light that the plurality of second sub-filter units Rr allow to transmit. That is, in each second filter unit 222R, the wavelength range of the light that one of the second sub-filter units Rr allows to transmit corresponds to the wavelength range of the light of one color included in the light for displaying the second image.

For example, with continued reference to FIG. 10, in a case where the wavelength ranges of the light for displaying the first image include a wavelength range of first red light, a wavelength range of first green light and a wavelength range of first blue light, each first filter unit 212L includes a first red sub-filter unit $L_{1R}$, a first green sub-filter unit $L_{1G}$ and a first blue sub-filter unit $L_{1B}$. The wavelength range of the first red light is within a wavelength range of the light that the first red sub-filter unit $L_{1R}$ allows to transmit, the wavelength range of the first green light is within a wavelength range of the light that the first green sub-filter unit $L_{1G}$ allows to transmit, and the wavelength range of the first blue light is within a wavelength range of the light that the first blue sub-filter unit $L_{1B}$ allows to transmit. With continued reference to FIG. 11, in a case where the wavelength ranges of the light for displaying the second image include a wavelength range of second red light, a wavelength range of second green light and a wavelength range of second blue light, each second filter unit 222R includes a second red sub-filter unit $R_{rR}$, a second green sub-filter unit $R_{rG}$ and a second blue sub-filter unit $R_{rB}$. The wavelength range of the second red light is within a wavelength range of the light that the second red sub-filter unit $R_{rR}$ allows to transmit, the wavelength range of the second green light is within a wavelength range of the light that the second green sub-filter unit $R_{rG}$ allows to transmit, and the wavelength range of the second blue light is within a wavelength range of the light that the second blue sub-filter unit $R_{rB}$ allows to transmit.

It will be understood that the first filter layer 212 allows the light for displaying the first image to transmit, and the first image is displayed by the first pixels of the display panel. Therefore, each first red sub-filter unit $L_{1R}$ of the first filter layer 212 and each first red sub-pixel $g_{LR}$ of the first pixel in the display apparatus may be formed by using the same red filter material, each first green sub-filter unit $L_{1G}$ of the first filter layer 212 and each first green sub-pixel $g_{LG}$ of the first pixel in the display apparatus may be formed by using the same green filter material, and each first blue sub-filter unit $L_{1B}$ of the first filter layer 212 and each first blue sub-pixel $g_{LB}$ of the first pixel in the display apparatus may be formed by using the same blue filter material, thereby facilitating purchasing the filter materials, improving a utilization rate of each of the filter materials and reducing a cost of fabricating the display apparatus.

Similarly, the second filter layer 222 allows the light for displaying the second image to transmit, and the second image is displayed by the second pixels of the display panel. Therefore, each second red sub-filter unit $R_{rR}$ of the second filter layer 222 and each second red sub-pixel $g_{RR}$ of the second pixel in the display apparatus may be formed by using the same red filter material, each second green sub-filter unit $R_{rG}$ of the second filter layer 222 and each second green sub-pixel $g_{RG}$ of the second pixel in the display apparatus may be formed by using the same green filter material, and each second blue sub-filter unit $R_{rB}$ of the second filter layer 222 and each second blue sub-pixel $g_{RB}$ of the second pixel in the display apparatus may be formed by using the same blue filter material, thereby facilitating purchasing the filter materials, improving the utilization rate of each of the filter materials and reducing the cost of fabricating the display apparatus.

Of course, the material for fabricating the first filter layer 212 and the second filter layer 222 may also be selected and determined according to a degree of colorization to be achieved. That is, wavelength ranges of light that the filter materials used by the first filter layer 212 and the second filter layer 222 allow to transmit are related to the degree of colorization to be correspondingly achieved. For example, in a case where the degree of colorization to be achieved by the first filter layer 212 and the second filter layer 222 is large, the wavelength ranges of the light that the filter materials used by the first filter layer 212 and the second filter layer 222 allow to transmit are small. Conversely, in a case where the degree of colorization to be achieved by the first filter layer 212 and the second filter layer 222 is small, the wavelength ranges of the light that the filter materials used by the first filter layer 212 and the second filter layer 222 allow to transmit are large.

Figure 13:
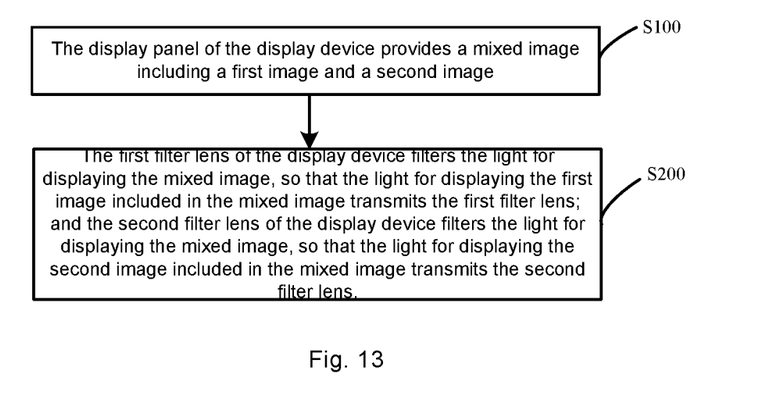
FIG. 13 is a flow diagram of a display method in accordance with some embodiments of the present disclosure.

Some embodiments of the present disclosure provide a display method, and the display method is applied to the display apparatus provided by the embodiments described above. With reference to FIGS. 2 and 13, the display method includes S100~S200.

In S100, the display panel 1 of the display apparatus outputs light for displaying a mixed image including a first image and a second image.

In S200, the first filter lens 21 of the display apparatus filters the light for displaying the mixed image, so that the light P1 for displaying the first image included in the mixed image transmits the first filter lens 21; and the second filter lens 22 of the display apparatus filters the light for displaying the mixed image, so that the light P2 for displaying the second image included in the mixed image transmits the second filter lens 22.

Since the first filter lens 21 corresponds to the left eye of the user and the second filter lens 22 corresponds to the right eye of the user, the light P1 transmitting the first filter lens 21 and for displaying the first image enters the left eye, and the light P2 transmitting the second filter lens 22 and for displaying the second image enters the right eye. In this way, the light P1 for displaying the first image serves as the light for displaying the left-eye image, the light P2 for displaying the second image serves as the light for displaying the right-eye image, and the first image (i.e., the left-eye image) and the second image (i.e., the right-eye image) may be synthesized in the user's brain, so that the user observes the stereoscopic image.

Beneficial effects of the display method provided by some embodiments of the present disclosure are the same as the beneficial effects of the display apparatus provided by some of the embodiments described above, which are not elaborated herein.

The method described in some embodiments of the present disclosure may be implemented by means of executing instructions. The instructions may be performed by one or more processors, and may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read only memory (CD-ROM) or any other form of a storage medium known in the art.

Some embodiments of the present disclosure provide a non-transitory computer-readable storage medium storing executable instructions that, when executed by a display apparatus, cause the display apparatus to perform the display method described in the above embodiments.

A person skilled in the art will appreciate that in one or more of the examples described above, the functions described herein may be implemented by using a hardware, a software, a firmware or any combination thereof. When implemented by using the software, the functions may be stored in a computer readable medium or transmitted as one or more instructions or codes on the computer readable medium. The computer readable medium includes both a computer storage medium and a communication medium, wherein the communication medium includes any medium that facilitates a transfer of a computer program from one location to another. The storage medium may be any available medium that can be accessed by a general-purpose computer or a special-purpose computer.

The foregoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display apparatus, comprising:
a display panel configured to output light for displaying a mixed image including a first image and a second image; and
a filter device disposed at a light exit side of the display panel, the filter device including a first filter lens and a second filter lens, wherein an orthographic projection of the first filter lens on a light-emitting surface of the display panel does not overlap with an orthographic projection of the second filter lens on the light-emitting surface of the display panel, and wavelength ranges of light that the first filter lens allows to transmit do not overlap with wavelength ranges of light that the second filter lens allows to transmit, wherein
wavelength ranges of light for displaying the first image are within the wavelength ranges of the light that the first filter lens allows to transmit, and wavelength ranges of light for displaying the second image are within the wavelength ranges of the light that the second filter lens allows to transmit;
the first filter lens includes a first lens and a first filter layer disposed on a surface of the first lens, and the first filter layer includes a plurality of first filter units;
the second filter lens includes a second lens and a second filter layer disposed on a surface of the second lens, and the second filter layer includes a plurality of second filter units;
wavelength ranges of light that the plurality of first filter units allow to transmit do not overlap with wavelength ranges of light that the plurality of second filter units allow to transmit; and
the wavelength ranges of the light for displaying the first image are within the wavelength ranges of the light that the plurality of first filter units allow to transmit, and the wavelength ranges of the light for displaying the second image are within the wavelength ranges of the light that the plurality of second filter units allow to transmit.

2. The display apparatus according to claim 1, wherein the display panel includes a plurality of first pixels configured to output the light for displaying the first image, and a plurality of second pixels configured to output the light for displaying the second image.

3. The display apparatus according to claim 2, wherein
the wavelength ranges of the light for displaying the first image include wavelength ranges of light of a plurality of colors; each first pixel includes a plurality of first sub-pixels, and the plurality of first sub-pixels are configured to output light, wavelength ranges of which are the same as the wavelength ranges of the light of the plurality of colors included in the wavelength ranges of the light for displaying the first image in one-to-one correspondence; and
the wavelength ranges of the light for displaying the second image include wavelength ranges of light of a plurality of colors; each second pixel includes a plurality of second sub-pixels, and the plurality of second sub-pixels are configured to output light, wavelength ranges of which are the same as the wavelength ranges of the light of the plurality of colors included in the wavelength ranges of the light for displaying the second image in one-to-one correspondence.

4. The display apparatus according to claim 3, wherein
the wavelength ranges of the light for displaying the first image include a wavelength range of first red light, a wavelength range of first green light and a wavelength range of first blue light; each first pixel includes a first red sub-pixel, a first green sub-pixel and a first blue sub-pixel, the first red sub-pixel is configured to output light, a wavelength range of which is the wavelength range of the first red light, the first green sub-pixel is configured to output light, a wavelength range of which is the wavelength range of the first green light, and the first blue sub-pixel is configured to output light, a wavelength range of which is the wavelength range of the first blue light; and
the wavelength ranges of the light for displaying the second image include a wavelength range of second red light, a wavelength range of second green light and a wavelength range of second blue light; each second pixel includes a second red sub-pixel, a second green sub-pixel and a second blue sub-pixel, the second red sub-pixel is configured to output light, a wavelength range of which is the wavelength range of the second red light, the second green sub-pixel is configured to output light, a wavelength range of which is the wavelength range of the second green light, and the second blue sub-pixel is configured to output light, a wavelength range of which is the wavelength range of the second blue light.

5. The display apparatus according to claim 2, wherein each first pixel includes a plurality of first filter portions, and each second pixel includes a plurality of second filter portions; and
a wavelength range of light that each first filter portion allows to transmit is within the wavelength ranges of the light that the first filter lens allows to transmit, and a wavelength range of light that each second filter portion allows to transmit is within the wavelength ranges of the light that the second filter lens allows to transmit.

6. The display apparatus according to claim 2, wherein each first pixel includes a plurality of first light-emitting devices, and each second pixel includes a plurality of second light-emitting devices; and
each first light-emitting device is configured to emit light, a wavelength range of which is within the wavelength ranges of the light that the first filter lens allows to transmit, and each second light-emitting device is configured to emit light, a wavelength range of which is within the wavelength ranges of the light that the second filter lens allows to transmit.

7. The display apparatus according to claim 2, wherein the plurality of first pixels and the plurality of second pixels are alternately arranged in a row direction of arranging the first and second pixels, and one of the plurality of second pixels is disposed between each adjacent two first pixels.

8. The display apparatus according to claim 1, wherein
the wavelength ranges of the light for displaying the first image include wavelength ranges of light of a plurality of colors; each first filter unit includes a plurality of first sub-filter units, and the wavelength ranges of the light of the plurality of colors included in the wavelength ranges of the light for displaying the first image are within wavelength ranges of light that the plurality of first sub-filter units allow to transmit in one-to-one correspondence; and
the wavelength ranges of the light for displaying the second image include wavelength ranges of light of a plurality of colors; each second filter unit includes a plurality of second sub-filter units, and the wavelength ranges of the light of the plurality of colors included in the wavelength ranges of the light for displaying the second image are within wavelength ranges of light that the plurality of second sub-filter units allow to transmit in one-to-one correspondence.

9. The display apparatus according to claim 8, wherein
the wavelength ranges of the light for displaying the first image include a wavelength range of first red light, a wavelength range of first green light and a wavelength range of first blue light; each first filter unit includes a first red sub-filter unit, a first green sub-filter unit and a first blue sub-filter unit, the wavelength range of the first red light is within a wavelength range of light that the first red sub-filter unit allows to transmit, the wavelength range of the first green light is within a wavelength range of light that the first green sub-filter unit allows to transmit, and the wavelength range of the first blue light is within a wavelength range of light that the first blue sub-filter unit allows to transmit; and
the wavelength ranges of the light for displaying the second image include a wavelength range of second red light, a wavelength range of second green light and a wavelength range of second blue light; each second filter unit includes a second red sub-filter unit, a second green sub-filter unit and a second blue sub-filter unit, the wavelength range of the second red light is within a wavelength range of light that the second red sub-filter unit allows to transmit, the wavelength range of the second green light is within a wavelength range of light that the second green sub-filter unit allows to transmit, and the wavelength range of the second blue light is within a wavelength range of light that the second blue sub-filter unit allows to transmit.

10. The display apparatus according to claim 1, wherein the first filter layer and the second filter layer include interference filter films respectively.

11. The display apparatus according to claim 1, wherein
the first filter layer is disposed on a surface of the first lens away from the display panel, and the second filter layer is disposed on a surface of the second lens away from the display panel; or
the first filter layer is disposed on a surface of the first lens close to the display panel, and the second filter layer is disposed on a surface of the second lens close to the display panel.

12. The display apparatus according to claim 1, wherein
a distance between the light-emitting surface of the display panel and a first cross-section of the first filter lens in a direction perpendicular to the light-emitting surface is smaller than a focal length of the first filter lens, and the first cross-section passes through an optical center of the first filter lens and is parallel to the light-emitting surface of the display panel; and
a distance between the light-emitting surface of the display panel and a second cross-section of the second filter lens in the direction perpendicular to the light-emitting surface is smaller than a focal length of the second filter lens, and the second cross-section passes through an optical center of the second filter lens and is parallel to the light-emitting surface of the display panel.

13. A display method applied to the display apparatus according to claim 1, the method comprising:
outputting, by the display panel of the display apparatus, light for displaying the mixed image including the first image and the second image;
filtering, by the first filter lens of the display apparatus, the light for displaying the mixed image, so that the light for displaying the first image included in the mixed image transmits the first filter lens; and
filtering, by the second filter lens of the display apparatus, the light for displaying the mixed image, so that the light for displaying the second image included in the mixed image transmits the second filter lens.

14. A non-transitory computer-readable storage medium storing executable instructions that, when executed by a display apparatus, cause the display apparatus to perform the display method according to claim 13.

* * * * *